(12) United States Patent
Guest et al.

(10) Patent No.: US 10,730,361 B2
(45) Date of Patent: Aug. 4, 2020

(54) VEHICLE AIR SUSPENSION SWITCH

(71) Applicant: JAGUAR LAND ROVER LIMITED, Whitley, Coventry, Warwickshire (GB)

(72) Inventors: Philip Guest, Warwick (GB); David Grace, Evesham (GB); Evangelos Contoleon, Leamington Spa (GB); Gary Thurbon, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 177 days.

(21) Appl. No.: 16/074,732

(22) PCT Filed: Jan. 30, 2017

(86) PCT No.: PCT/EP2017/051916
§ 371 (c)(1),
(2) Date: Aug. 1, 2018

(87) PCT Pub. No.: WO2017/134008
PCT Pub. Date: Aug. 10, 2017

(65) Prior Publication Data
US 2020/0164712 A1     May 28, 2020

(30) Foreign Application Priority Data
Feb. 1, 2016 (GB) .................... 1601755

(51) Int. Cl.
*B60G 17/052* (2006.01)
*B60G 17/016* (2006.01)

(52) U.S. Cl.
CPC ....... *B60G 17/0525* (2013.01); *B60G 17/016* (2013.01); *B60G 2204/81* (2013.01); *B60G 2401/20* (2013.01); *B60G 2500/32* (2013.01)

(58) Field of Classification Search
CPC .............. B60G 17/0525; B60G 17/016; B60G 2401/20; B60G 2204/81; B60G 2500/32
See application file for complete search history.

(56) References Cited

U.S. PATENT DOCUMENTS

2006/0293800 A1   12/2006   Bauer et al.
2008/0243336 A1*  10/2008   Fitzgibbons ........ B60W 50/082
                                                 701/38

(Continued)

FOREIGN PATENT DOCUMENTS

GB    1269486      4/1974
GB    2387582 A    10/2003

(Continued)

OTHER PUBLICATIONS

International Search Report for International application No. PCT/EP2017/051916, dated Apr. 6, 2017, 5 pages.

(Continued)

*Primary Examiner* — Drew J Brown
(74) *Attorney, Agent, or Firm* — Reising Ethington P.C.

(57) ABSTRACT

A control system for a suspension height adjustment mechanism of a vehicle. The suspension height adjustment mechanism comprises a front suspension height adjustment mechanism at a front end of the vehicle and a rear suspension height adjustment mechanism at a rear end of the vehicle. The control system is configured to control the suspension height adjustment mechanism in response to user-generated control signals to: increase the height of at least the rear end of the vehicle to a first predetermined vehicle height corresponding to a High tow hitch height; and decrease the height of at least the rear end of the vehicle to a second predetermined vehicle height corresponding to a Low tow hitch height. Both the first and second predetermined vehicle heights are accessible from one or more other vehicle height that is different to the first and second predetermined (Continued)

heights. Decreasing the vehicle height from the High tow hitch height to the Low tow hitch height comprises the control system controlling the suspension height adjustment mechanism such that the height of the front end of the vehicle is decreased less than the height of the rear end of the vehicle.

20 Claims, 5 Drawing Sheets

(56)  References Cited

U.S. PATENT DOCUMENTS

| | | | |
|---|---|---|---|
| 2015/0137463 A1* | 5/2015 | McLennan | B60G 17/016 280/6.153 |
| 2016/0052548 A1* | 2/2016 | Singh | B62D 15/0265 701/37 |
| 2018/0154726 A1* | 6/2018 | Fida | B60G 17/017 |
| 2019/0047346 A1* | 2/2019 | Carpenter | B60G 11/27 |
| 2019/0111753 A1* | 4/2019 | Reuter | B60G 17/0155 |

FOREIGN PATENT DOCUMENTS

| | | |
|---|---|---|
| GB | 2513393 A | 10/2014 |
| JP | S6285707 A | 4/1987 |
| JP | 2007196928 A | 8/2007 |
| WO | WO2006135326 A1 | 12/2006 |

OTHER PUBLICATIONS

Written Opinion for International application No. PCT/EP2017/051916, dated Apr. 6, 2017, 7 pages.

Combined Search and Examination Report for application No. GB1601755.0, dated Jun. 23, 2016, 8 pages.

* cited by examiner

VEHICLE AIR SUSPENSION SWITCH

TECHNICAL FIELD

The present disclosure relates to a vehicle air suspension switch and particularly, but not exclusively, to a boot-mounted switch for a vehicle. Aspects of the invention relate to a control system, to a suspension system, to a vehicle comprising a control system, or a suspension system, to a method of controlling a suspension height adjustment mechanism, to a controller for controlling a suspension height adjustment mechanism, and to a non-transitory, computer-readable storage medium.

BACKGROUND

It is known to provide vehicle suspension systems that can be configured to attain a number of predetermined vehicle ride heights. These systems can be operable by way of one or more manual switches on a console of the vehicle and accessible from the driving position, such that a user can choose the most appropriate suspension setting for their style of driving or for the nature of the terrain the vehicle is traversing. Such suspension settings can include a Normal suspension ride height, an Off-Road suspension ride height and an Access height, for example.

In these known systems, often the option to adjust the suspension of the vehicle is only available to a user when they are seated in a driver's seat or a front passenger's seat of the vehicle, and the available vehicle ride heights are restricted to a number of pre-set ride heights. Some vehicles go part way to addressing such limitations and offer limited vehicle ride height adjustment functionality when the vehicle is parked and the user is positioned outside of the vehicle cabin.

The available vehicle ride heights in such systems often include a Normal height and a Loading height, and the user may opt to lower the vehicle ride height from the Normal height to the Loading height to increase the ease with which they can access the rear loadspace of the vehicle, for example. This functionality is limited, however, typically allowing the user to select only one of two pre-set vehicle ride heights, a 'raise' switch being used to access an upper ride height when the vehicle is positioned at a lower ride height, and a 'lower' switch being used to access the lower ride height when the vehicle is positioned at the upper ride height.

There remains a need to provide a vehicle suspension system with increased functionality and greater flexibility for the user. The present invention has been devised to mitigate or overcome at least some of the above-mentioned problems.

SUMMARY OF THE INVENTION

According to an aspect of the present invention there is provided a control system for a suspension height adjustment mechanism of a vehicle, the suspension height adjustment mechanism comprising a front suspension height adjustment mechanism at a front end of the vehicle and a rear suspension height adjustment mechanism at a rear end of the vehicle. The control system is configured to control the suspension height adjustment mechanism in response to user-generated control signals to:
increase the height of at least the rear end of the vehicle to a first predetermined vehicle height corresponding to a High tow hitch height; and decrease the height of at least the rear end of the vehicle to a second predetermined vehicle height corresponding to a Low tow hitch height. Both the first and second predetermined vehicle heights are accessible from one or more other vehicle height that is different to the first and second predetermined heights. Decreasing the vehicle height from the High tow hitch height to the Low tow hitch height comprises the control system controlling the suspension height adjustment mechanism such that the height of the front end of the vehicle is decreased less than the height of the rear end of the vehicle.

A system that is operable by a user to access a High tow hitch height and a Low tow hitch height enables the user to easily access at least two predetermined vehicle heights. Advantageously, the user is able to operate the input device so as to configure the vehicle to be at an appropriate height for hitching or unhitching a trailer to the vehicle, or for ease of access to a rear loadspace of the vehicle. Additionally, the High tow hitch height and Low tow hitch height can be reached from any one of a number of other vehicle heights, allowing the user to consistently set the tow hitch height irrespective of a starting height of the vehicle.

Advantageously, the control system may be configured to control the suspension height adjustment mechanism to decrease the height of the front end of the vehicle by an amount that is dependent upon headlamp beam alignment.

In response to a user-generated control signal to increase the height of the rear end of the vehicle to the first predetermined height, the control system is optionally configured to determine a rear end target height to which the rear suspension height adjustment mechanism increases the height of the rear end of the vehicle, the rear end target height being determined in dependence on a front starting height. In this instance, the rear end target height may be determined using a look-up table.

Increasing and decreasing the height of the vehicle may comprise controlling the suspension height adjustment mechanism so as to pivot a longitudinal axis of the vehicle about a point offset forward from a front axle of the vehicle. Pivoting a longitudinal axis of the vehicle about a point offset forward from a front axle of the vehicle may comprise controlling the suspension height adjustment mechanism so as to pivot a longitudinal axis of the vehicle about a point offset below and forward from the front axle of the vehicle. Alternatively, pivoting a longitudinal axis of the vehicle about a point offset forward from a front axle of the vehicle may comprise controlling the suspension height adjustment mechanism so as to pivot a longitudinal axis of the vehicle about a point offset above and forward from the front axle of the vehicle.

A longitudinal axis of the vehicle may be pivoted about the furthest point away from the vehicle at which light from headlamps of the vehicle is incident on the ground. Advantageously, pivoting the longitudinal axis about this point guards against a beam of light from the headlamps from being raised to an unacceptable height while the suspension is lowered or raised, thereby guarding against the possibility of third parties being dazzled by light from the headlamps during vehicle height adjustments. The control system may further comprise one or more input device operable to create a user-generated control signal. Said one or more input device may comprise a manually-operable input device mountable in a boot of the vehicle. The one or more input device may optionally comprise a manually-operable remote input device which may for example be a key fob for locking/unlocking the vehicle, a bespoke remote control device or an app running on a mobile device, for example a smart phone or a smart watch. Alternatively, or additionally, the one or more input device may comprise a manually-operable input device mountable in a cabin of the vehicle.

An input of the control system may therefore be configured to receive user-generated control signals from multiple input devices. The provision of multiple input devices gives the user the option to control the suspension height adjustment mechanism from more than one location around the vehicle. The user may choose to operate the multiple input devices in combination, accessing a first vehicle height using a first input device, and accessing a second vehicle height using a second input device. The control system may comprise an input device in the form of a switch.

In one embodiment, the control system may comprise an input device having a first selector operable to control the suspension height adjustment mechanism to increase the height of at least the rear end of the vehicle. Optionally, the input device may comprise a second selector operable to control the suspension height adjustment mechanism to decrease the height of at least the rear end of the vehicle.

In the case that the input device comprises a first selector and/or a second selector, when the first selector and/or the second selector are operated continuously, the control system may be configured to raise or lower at least the rear end of the vehicle in a continuous manner for the duration of the continuous operation. Such functionality may guard against unintentional operation of the suspension height adjustment mechanism, and may therefore guard against a potential entrapment situation, in which an object is trapped beneath the vehicle. Additionally, this functionality may assist the user in guarding against the vehicle body or doors contacting the ground. The first selector and/or the second selector may be operable by pressing.

In an example, the suspension height adjustment mechanism may be controllable to access a continuum of vehicle heights. A specific height within said continuum may be operable by terminating operation of the first selector and/or the second selector.

The control system may be further configured to adjust the vehicle height to access a third predetermined vehicle height, corresponding to a Normal tow hitch height. The first and second selectors may be operable simultaneously so as to adjust the vehicle height to the third predetermined vehicle height.

The High tow hitch height may refer to a tow hitch height that is between approximately 80 mm and approximately 100 mm above the Normal tow hitch height. The Low tow hitch height may refer to a tow hitch height that is between approximately 60 mm and approximately 80 mm below the Normal tow hitch height.

In one embodiment the control system may be further configured to control the rear suspension height adjustment mechanism and the front suspension height adjustment mechanism such that the height of the rear end of the vehicle is adjusted prior to the height of the front end of the vehicle.

The control system may be configured to provide feedback to the user upon the vehicle height reaching a predetermined vehicle height. Advantageously, the control system may be configured to at least temporarily pause said increasing or decreasing in the event that the vehicle height reaches a predetermined vehicle height.

The predetermined vehicle height may comprise one of the Low tow hitch height, the High tow hitch height or the Normal tow ball height.

According to a further aspect of the invention, there is provided a suspension system for a vehicle, the suspension system comprising a control system in accordance with a previous aspect of the invention.

According to another aspect of the invention, there is provided a vehicle, the vehicle comprising a control system, or a suspension system, in accordance with a previous aspect of the invention.

According to another aspect of the invention, there is provided a method of controlling a suspension height adjustment mechanism of a vehicle, the method comprising controlling the suspension height adjustment mechanism in response to user-generated control signals to: increase the height of at least a rear end of the vehicle to a first predetermined vehicle height corresponding to a High tow hitch height; and decrease the height of at least said rear end of the vehicle to a second predetermined vehicle height corresponding to a Low tow hitch height. Both the first and second predetermined vehicle heights are accessible from one or more other vehicle height that is different to the first and second predetermined heights. The method further comprises controlling a front suspension height adjustment mechanism at a front end of the vehicle and controlling a rear suspension height adjustment mechanism at the rear end of the vehicle. Decreasing the vehicle height from the High tow hitch height to the Low tow hitch height comprises controlling the suspension height adjustment mechanism such that the height of the front end of the vehicle is decreased less than the height of the rear end of the vehicle.

According to another aspect of the invention, there is provided a controller for controlling a suspension height adjustment mechanism of a vehicle. The controller comprises an electronic processor having an electrical input for receiving: a first user-generated signal indicative of a user selection of a first predetermined vehicle height corresponding to a High tow hitch height; and, a second user-generated signal indicative of a user selection of a second predetermined vehicle height corresponding to a Low tow hitch height. The controller comprises an electronic memory device electrically coupled to the electronic processor and having instructions stored therein. The processor is configured to access the memory device and execute the instructions stored therein such that it is operable to: control the suspension height adjustment mechanism in response to said first user-generated control signal to increase the height of at least a rear end of the vehicle to the first predetermined vehicle height, and control the suspension height adjustment mechanism in response to said second user-generated control signal to decrease the height of at least said rear end of the vehicle to said second predetermined vehicle height. Both first and second predetermined vehicle heights are accessible from one or more other vehicle heights that is different to the first and second predetermined heights. In response to the second user-generated signal, the processor controls a front suspension height adjustment mechanism at a front end of the vehicle and controls a rear suspension height adjustment mechanism at the rear end of the vehicle such that the height of the front end of the vehicle is decreased less than the height of the rear end of the vehicle.

According to another aspect of the invention, there is provided a non-transitory, computer-readable storage medium storing instructions thereon that when executed by one or more electronic processor causes the one or more electronic processors to carry out a method in accordance with a previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
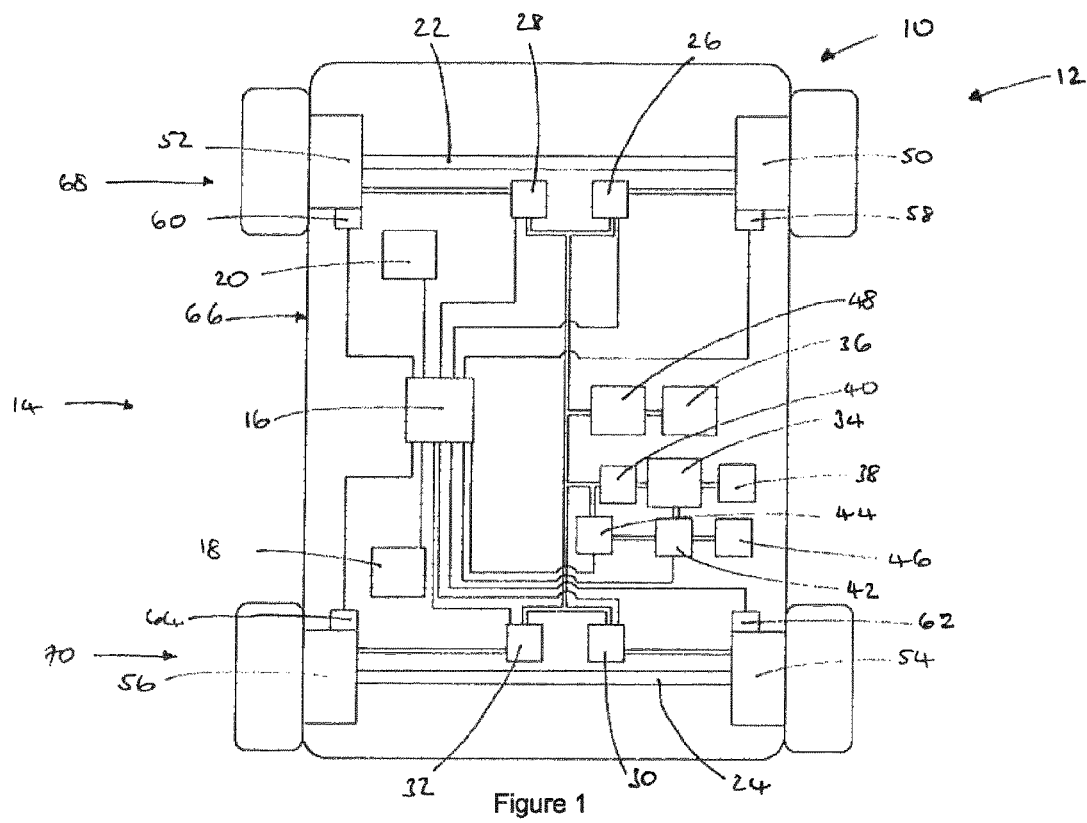
FIG. 1 is a schematic plan view of a vehicle having a vehicle suspension system of an embodiment of the invention.

FIG. 1 shows a schematic view of a vehicle suspension system 10 of a vehicle 12. The vehicle suspension system 10 comprises a control system, in the form of a suspension control system 14, having a suspension control module (SCM) 16, the SCM 16 being connected to a first input device in the form of a boot-mounted user control module, including a boot-mounted switch 18. The SCM 16 is further connected to a second input device in the form of a cabin-mounted user control module, or cabin-mounted switch 20, and to a front valve arrangement and a rear valve arrangement, corresponding to a front axle 22 and a rear axle 24 of the vehicle 12 respectively. The front valve arrangement comprises a front right corner valve 26 and a front left corner valve 28. Similarly, the rear valve arrangement comprises a rear right corner valve 30 and a rear left corner valve 32.

The vehicle suspension system 10 further comprises an air compressor pump 34 having an external motor, and an air reservoir 36. In one embodiment, air enters the vehicle suspension system 10 through an inlet silencer 38 that is in fluid communication with the compressor pump 34. The compressor pump 34 provides air at high pressure to components of the vehicle suspension system 10, the air passing from an outlet of the compressor pump and through an air dryer 40. The compressor pump 34 is further connected to a main exhaust valve 42, the main exhaust valve controlling the removal of air from the system in conjunction with a pilot exhaust valve 44. Air expelled from the main exhaust valve 42 passes through an exhaust 46.

The air reservoir 36 acts as a store of compressed air, air flow from the reservoir being controlled by way of a reservoir valve 48. The front corner valves 26, 28 and rear corner valves 30, 32 are each in fluid communication with a suspension height adjustment mechanism of the vehicle suspension system 10. The suspension height adjustment mechanism includes four air spring arrangements: a first air spring arrangement 50, corresponding to a right-hand side of the front axle 22 of the vehicle 12; a second air spring arrangement 52 corresponding to a left-hand side of the front axle 22 of the vehicle 12; a third air spring arrangement 54 corresponding to a right-hand side of the rear axle 24 of the vehicle 12; and a fourth air spring arrangement 56 corresponding to a left-hand side of the rear axle 24 of the vehicle 12. The SCM 16 is further configured to communicate with a front right height sensor 58, a front left height sensor 60, a rear right height sensor 62 and a rear left height sensor 64, each height sensor 58, 60, 62, 64 being provided in proximity to the respective air spring arrangement 50, 52, 54, 56.

The SCM 16 is configured to receive user-generated control signals from the boot-mounted switch 18 and from the cabin-mounted switch 20, and to control adjustments to a height of the vehicle 12 in response to the user-generated control signals. Such adjustments are controlled through communication between the SCM 16 and the valves of the vehicle suspension system 10. The front right corner valve 26 and front left corner valve 28 are configured to regulate the air flow to the first and second air spring arrangements 50, 52, respectively. The rear right and rear left corner valves 30, 32 are arranged so as to control the air flow to the third and fourth air spring arrangements 54, 56, respectively. The corner valves 26, 28, 30, 32 are further arranged to regulate the flow of air in an opposite direction, to remove excess air from the air spring arrangements 50, 52, 54, 56.

In order to permit air to flow to one or more of the air spring arrangements 50, 52, 54, 56, the SCM 16 communicates with the reservoir valve 48 and with the relevant corner valve(s) 26, 28, 30, 32 of the vehicle suspension system 10 to open the valves, allowing air to flow from the reservoir 36 and to the respective air spring arrangement 50, 52, 54, 56. Compressed air from the compressor pump 34 is subsequently used to re-fill the reservoir 36. Alternatively, the SCM 16 may control lifting of the vehicle by communicating with the compressor pump 34, configuring the compressor pump 34 to drive compressed air through the system while opening the relevant corner valve(s) 26, 28, 30, 32.

To permit air to be removed from one or more of the air spring arrangements 50, 52, 54, 56, the SCM 16 communicates with the pilot exhaust valve 44 and with the relevant corner valve 26, 28, 30, 32 to open the valves. Opening the pilot exhaust valve 44 drives air through the main exhaust valve 42 and out through the exhaust 46, expelling the air from the vehicle suspension system 10.

The vehicle 12 has a chassis 66 that provides the main supporting structure of the vehicle 12. It will be appreciated that the chassis 66 of the vehicle 12 may be in the form of a frame that is separate to a skin of the vehicle 12. The vehicle may alternatively be of monocoque construction, in which the vehicle body provides the main structural component of the vehicle 12. It will be appreciated that the invention described herein is equally as applicable to a vehicle 12 of monocoque construction, or to a vehicle of any other suitable configuration, as to a vehicle 12 with a separate frame and body.

The chassis 66 comprises a front end 68, corresponding to the front axle 22 of the vehicle 12, and a rear end 70, corresponding to the rear axle 24 of the vehicle 12. Each height sensor 58, 60, 62, 64 of the vehicle suspension system 10 provides a signal to the SCM 16 that is indicative of the instantaneous height of the chassis 66 at the position of the respective height sensor 58, 60, 62, 64. The height sensors 58, 60, 62, 64 are configured to communicate continuously with the SCM 16, such that the SCM 16 is provided with real-time information relating to the height of the chassis 66 at the right-hand and left-hand sides of the front and rear axles 22, 24 of the vehicle 12. The height of the chassis 66 at the right-hand and left-hand sides of the axles 22, 24 is measured from a wheel hub corresponding to the relevant side of the respective axle 22, 24 and to a reference location on the vehicle body. The reference location may be a point directly above the wheel hub. Alternatively, the height of the chassis 66 may be a relative dimension, calculated as the difference between this instantaneous height measurement and the same measurement taken when the vehicle is positioned at a reference height.

Figure 2:
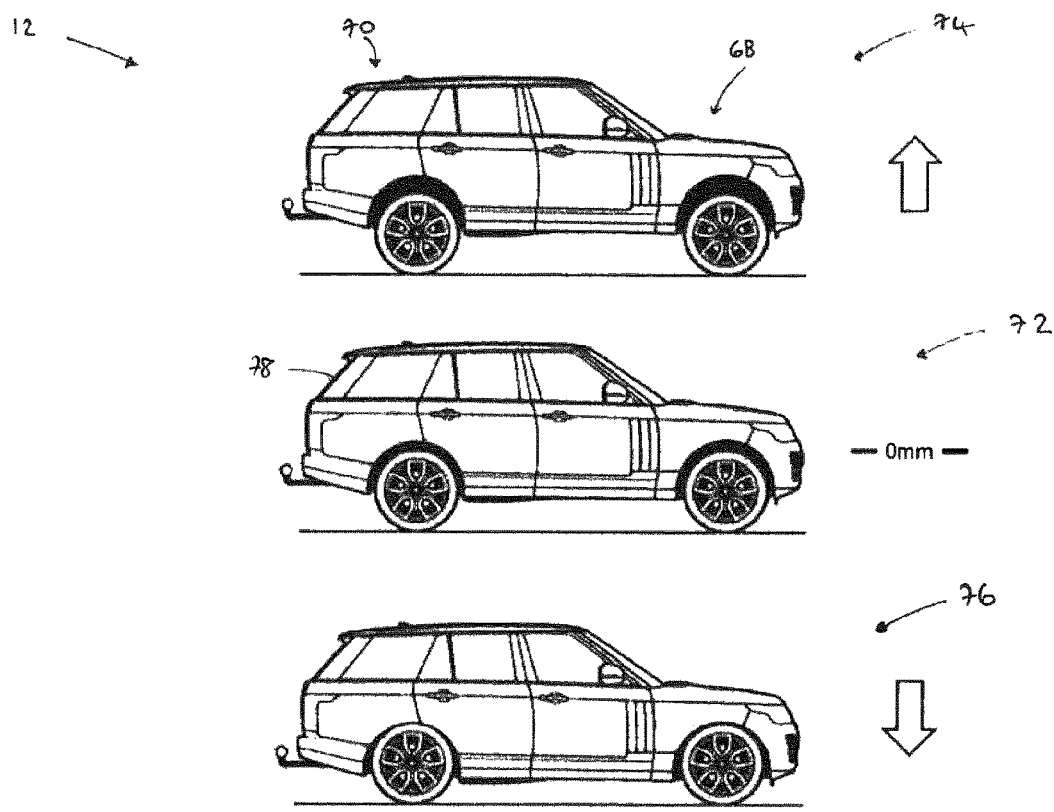
FIG. 2 is a side view of a vehicle comprising the vehicle suspension system of FIG. 1, depicting the vehicle at each of an Off-Road vehicle height, a Normal vehicle height, and an Access vehicle height.
Figure 3:
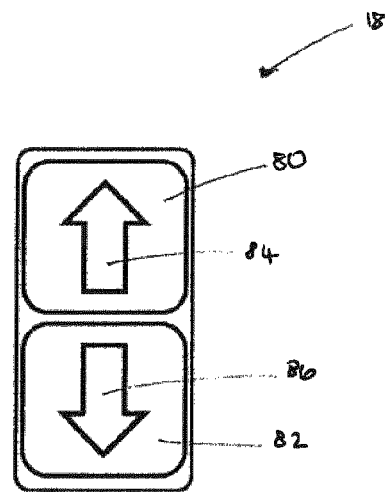
FIG. 3 is a view of a boot-mounted switch of the vehicle suspension system of FIG. 1.

The user is able to operate the suspension system 10 by way of the cabin-mounted switch 20 and the boot-mounted switch 18. In one embodiment, the cabin-mounted switch 20 consists of a switch positioned on a centre console within a cabin of the vehicle 12, the switch being operable by the user to select a setting from a discrete number of predetermined settings of the suspension system 10. Referring more generally to FIGS. 1 to 3, such suspension settings can include: Normal 72, referring to a default vehicle height, at which the vehicle suspension system 10 has been optimised for on-road use; Off-Road 74, referring to an elevated vehicle height relative to Normal 72, for improved ground clearance when the vehicle 12 is traversing uneven terrain; and, Access 76, which refers to a lower vehicle height relative to Normal 72, for easier vehicle loading and for easier occupant access and egress.

By positioning the switch in one of the predetermined positions, the user is able to select a suspension setting to suit their needs, or to suit the terrain the vehicle 12 is traversing. Such settings as those described here are known, and may be manually-selectable by the user. Alternatively, or additionally, the vehicle suspension system 10 may be automatically adjusted if certain conditions are satisfied. For example, the vehicle suspension system 10 may automatically reduce the vehicle height from Off-Road height 74 to Normal height 72 in the event that a measured vehicle speed exceeds a predetermined vehicle speed threshold value.

In one example, Off-Road height 74 typically corresponds to a vehicle height at which both the front end 68 of the chassis 66 and the rear end 70 of the chassis 66 are positioned 40 mm above their respective positions at Normal height 72. Access height 76 typically refers to a vehicle height at which both the front end 68 of the chassis 66 and the rear end 70 of the chassis 66 are positioned 50 mm below their respective positions at Normal height 72. Other suspension settings may be available, such as a second Off-Road height 74 at which the vehicle 12 is elevated relative to the Off-Road height 74, for use during wading and extreme off-road driving.

The boot-mounted switch 18 is positioned in a rear loadspace of the vehicle 12, and offers the user with additional functionality to that provided by the cabin-mounted switch 20. The rear loadspace is accessed by way of a rear tailgate 78 of the vehicle 12, and the boot-mounted switch 18 is operable only when the rear tailgate 78 is in an open position. Alternatively, a switch may be positioned in the proximity of a rear passenger door of the vehicle 12, such that the user may operate the switch from a position at the side of the vehicle 12. The boot-mounted switch 18 comprises two options, or buttons 80, 82, each of which can be selected by the user to access a separate function of the air spring arrangements 50, 52, 54, 56.

A first option, or first button 80, can be used to access a first function of the air spring arrangements 50, 52, 54, 56, to raise the vehicle suspension height while the first button 80 is pressed and held continuously. A second option, or second button 82, can be used to access a second function of the air spring arrangements 50, 52, 54, 56, to lower the vehicle height while the second button 82 is pressed and held continuously. Pressing and holding both buttons 80, 82 simultaneously effectively 'resets' the vehicle height, adjusting the front end 68 and the rear end 70 of the chassis 66 such that the vehicle height corresponds to Normal height 72. The first button 80 typically depicts an 'up' arrow 84, and the second button typically depicts a 'down' arrow 86, allowing the user to easily predict how the vehicle 12 will respond to selection of a button 80, 82 of the boot-mounted switch 18.

Figure 4:
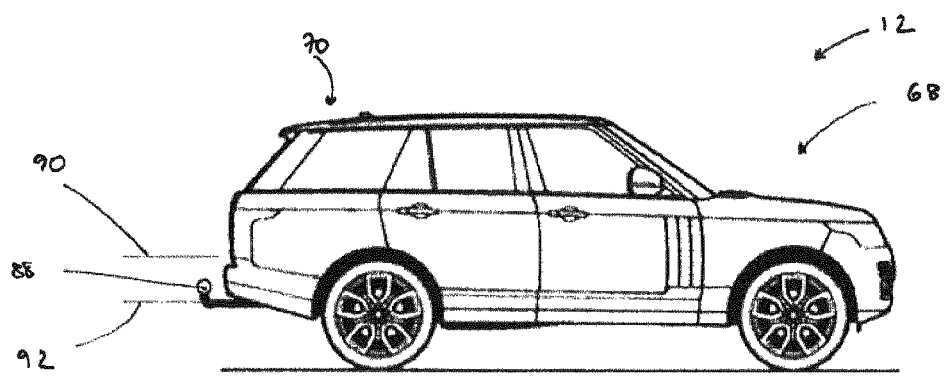
FIG. 4 is a side view of a vehicle comprising the vehicle suspension system of FIG. 1, depicting a High tow hitch height and a Low tow hitch height of the vehicle.

Through operation of the boot-mounted switch 18, the user can choose to access a number of predetermined target vehicle heights, in addition to the Normal height 72. As is shown in FIG. 4, the target vehicle heights correspond to target tow hitch heights of a tow hitch, or tow ball 88 of the vehicle. In particular, the SCM 16 is configured to control the air spring arrangements 50, 52, 54, 56 of the vehicle suspension system 10 so as to access a High tow hitch height, or High tow ball height 90 and a Low tow hitch height, or Low tow ball height 92. The user may choose to access the High tow ball height 90 to increase the ease with which they can hitch a trailer to the vehicle 12. Alternatively, the user may wish to access the High tow ball height 90 in order to manipulate the attitude of an attached trailer, for easier trailer loading or unloading, or for levelling the trailer on uneven ground. The Low tow ball height 92 may be chosen if the user wishes to increase the ease with which they can load and unload the rear loadspace of the vehicle 12, or if the user wishes to increase the ease with which they can un-hitch an attached trailer.

The Normal height corresponds to a Normal tow hitch height, or Normal tow ball height 72, at which the front end 68 of the chassis 66 is at a reference position of 0 mm, and the rear end 70 of the chassis 66 is at a reference position of 0 mm, as measured by the front and rear height sensors 58, 60, 62, 64 (shown in FIG. 1) respectively. The reference value of 0 mm is used here as a reference against which all other chassis heights are compared. The height of the front and rear ends 68, 70 of the chassis 66 at the Normal tow ball height 72 may be assigned any other suitable reference value.

The High tow ball height 90 corresponds to a tow ball height that is between approximately 80 mm and approximately 100 mm above the Normal tow ball height 72. Specifically, at the High tow ball height 90, the tow ball 88 is 95 mm above the Normal tow ball height 72. The Low tow ball height 92 corresponds to a tow ball height that is between approximately 60 mm and 80 mm below the Normal tow ball height 72. In particular, at the Low tow ball height 92, the tow ball 88 is 70 mm below the Normal tow ball height 72.

Referring to FIGS. 1 to 4, the SCM 16 is able to calculate an instantaneous tow ball height using the real-time height data provided by the height sensors 58, 60, 62, 64 of the vehicle suspension system 10. The SCM 16 uses the height data, along with dimensional data relating to the vehicle 12, to calculate the instantaneous tow ball height using trigonometry. Upon selection of a button 80, 82 of the boot-mounted switch 18, the SCM 16 determines the target tow ball height. In particular, if the user selects the first button 80 of the boot-mounted switch 18, the SCM 16 determines the target tow ball height to be the High tow ball height 90. Conversely, if the user selects the second button 82 of the boot-mounted switch 18, the SCM 16 determines the target tow ball height to be the Low tow ball height 92.

The SCM 16 is configured to control adjustments to vehicle height so that a longitudinal axis of the vehicle 12 pivots about a point offset forward from the front axle 22 of the vehicle 12. Upon selection of the first button 80 of the boot-mounted switch 18, a longitudinal axis of the vehicle 12 is pivoted about a point offset forward from and below the front axle 22 of the vehicle 12. Upon selection of the second button 82 of the boot-mounted switch 18, the longitudinal axis of the vehicle 12 is pivoted about a point offset above and forward from the front axle 22 of the vehicle 12. Vehicle height adjustments are controlled in this way to guard against the possibility of light beams from headlamps of the vehicle 12 dazzling other road users.

The SCM 16 is configured to minimise movement of the front end 68 of the chassis 66 in response to a target tow ball height, adjusting the height of the front end 68 of the chassis 66 only to achieve acceptable headlamp beam alignment and to guard against glare to other road users. This both reduces the time taken for adjustment of the vehicle suspension system 10, and minimises the air resources required to operate the air spring arrangements 50, 52, 54, 56 of the vehicle suspension system 10 in achieving the target tow ball height. Reducing height adjustments at the front end 68 of the chassis 66 also guards against entrapment situations, in which an object is caught beneath the front end of the chassis 66 during operation of the vehicle suspension system 10. Further, reducing these height adjustments may guard against a lower surface of the vehicle 12 being lowered onto a rock or onto another road surface formation, thereby avoiding damage to the vehicle 12.

The height of the front end 68 of the chassis 66 and height of the rear end 70 of the chassis 66 are therefore adjusted by different increments in the majority of height adjustment scenarios. The SCM 16 is provided with an algorithm for calculating a front target height for the front end 68 of the chassis 66 and a rear target height for the rear end 70 of the chassis 66 in response to a user selecting a target tow ball height. The algorithm is configured so that the target tow ball height is achieved in a manner in which adjustment of the first and second air spring arrangements 50, 52 is minimised. The SCM 16 is thus capable of using trigonometry to calculate a rear target height in dependence on the target tow ball height and a front target height, the front target height being selected so as to minimise movement of the front end 68 of the chassis 66.

Alternatively, the SCM 16 may employ a look-up table from which the front target height and the rear target height can be extracted, in dependence on a front starting height and a rear starting height of the chassis 66, as measured by the height sensors 58, 60, 62, 64 of the vehicle suspension system 10. The look-up table is established off-line, prior to use of the vehicle 12, during a calibration process. Upon selection of a button 80, 82 of the boot-mounted switch 18, the SCM 16 inputs the target tow ball height and the front and rear starting heights into the look-up table, extracting the corresponding front and rear target heights.

For the Low tow ball height 92, the look-up table comprises front and rear target heights for each possible combination of starting chassis heights, the target values achieving a tow ball height that is 70 mm below Normal tow ball height 72. Similarly, for the High tow ball height 90, the look-up table comprises front and rear target heights for each possible combination of starting chassis heights, the target values achieving a tow ball height that is 95 mm above Normal tow ball height 72. The vehicle suspension system 10 is thus configured to allow the user to adjust the vehicle height to achieve the predetermined target tow ball heights from any starting vehicle height.

Figure 5:
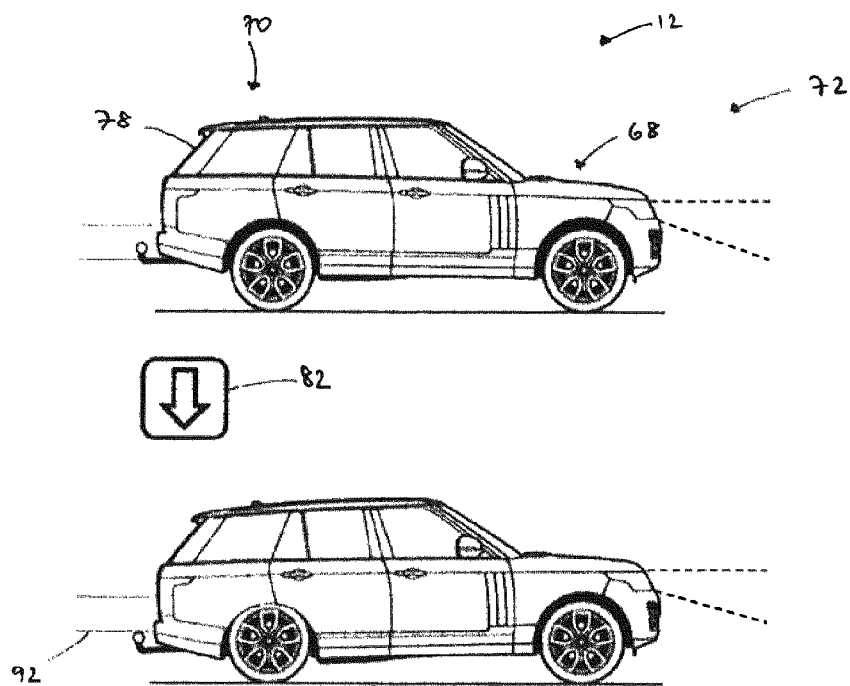
FIG. 5 is a side view of a vehicle comprising the vehicle suspension system of FIG. 1, depicting each of: a starting vehicle height corresponding to the Normal vehicle height; and, a target tow hitch height corresponding to the Low tow hitch height.

FIG. 5 depicts the operation of the vehicle suspension system 10 in use. In the scenario of FIG. 5, the vehicle 12 has been parked at Normal height 72, and the user intends to lower the vehicle 12 at the rear end 70. In this case, upon exiting the vehicle 12 and opening the rear tailgate 78, the user selects the second button 82 of the boot-mounted switch 18 to access the second function of the air spring arrangements 50, 52, 54, 56 and to lower the vehicle 12.

Selection of the second button 82 of the boot-mounted switch 18 triggers the boot-mounted switch 18 to send a user-generated control signal to the SCM 16. Upon receipt of the user-generated control signal, the SCM 16 determines the target tow ball height to be 70 mm below Normal tow ball height 72, the SCM 16 calculating a corresponding front target height and rear target height by any means previously described.

The SCM 16 is configured to simultaneously instruct lowering of the front end 68 of the chassis 66 and the rear end 70 of the chassis 66. At this stage then, the SCM 16 transmits a signal to the rear valve arrangement, the front valve arrangement and the pilot exhaust valve 44 of the vehicle suspension system 10, to allow compressed air to flow from all four air spring arrangements 50, 52, 54, 56 of the vehicle suspension system 10. Air flows from the air spring arrangements 50, 52, 54, 56 and through the corner valves 26, 28, 30, 32 of the front and rear valve arrangements. A small amount of air passes through the pilot exhaust valve 44, activating the main exhaust valve 42. Substantially all of the air subsequently passes through the main exhaust valve 42 and through the exhaust 46. Expulsion of air from the air spring arrangements causes the air spring arrangements to contract and the front end 68 and the rear end 70 of the chassis 66 are lowered.

The user-generated control signal is transmitted to the SCM 16 continuously while the second button 82 is selected, such that the vehicle 12 continues to lower to the Low tow ball height 92 while the button 82 is pressed. The height sensors 58, 60, 62, 64 continue to transmit height data to the SCM 16 and a feedback loop is established, whereby the SCM 16 maintains the rear valve arrangement in a state to remove air from the rear air spring arrangements 54, 56 while the rear end 70 of the chassis 66 is above the rear target height.

Similarly, the front valve arrangement is maintained in a state to remove air from the front air spring arrangements 50, 52 while the front end 68 of the chassis 66 is above the front target height. The chassis 66 is lowered slightly at the front end 68, to achieve acceptable headlamp alignment. The front end 68 of the chassis 66 undergoes a smaller vertical displacement relative to the rear end 70 of the chassis 66, so the vehicle 12 is inclined towards the front of the vehicle 12 at the Low tow ball target height 92, as shown in FIG. 5. When the signals from the height sensors 62, 64 indicate that the Low tow ball height 92 has been reached, the SCM 16 terminates signals to the front and rear valve arrangements, preventing further movement of the front end 68 and rear end 70 of the chassis 66, respectively. Once the SCM 16 determines that both the front and rear target heights have been reached, the SCM 16 configures the pilot exhaust valve 44 to close.

In one embodiment, the SCM 16 may receive signals from a Lights Control Module (LCM) of the vehicle 12. The LCM may be configured to inform the SCM 16 as to a state of the headlamps of the vehicle 12. In the event that the signals are indicative of the headlamps being in an OFF' state, there is no need for the chassis 66 to be lowered at the front end 68 to achieve acceptable headlamp alignment. Therefore, in this situation, the SCM 16 may be configured to inhibit lowering of the front end 68 of the chassis 66, minimising operation of the air spring arrangements 50, 52, 54, 56.

Figure 6:
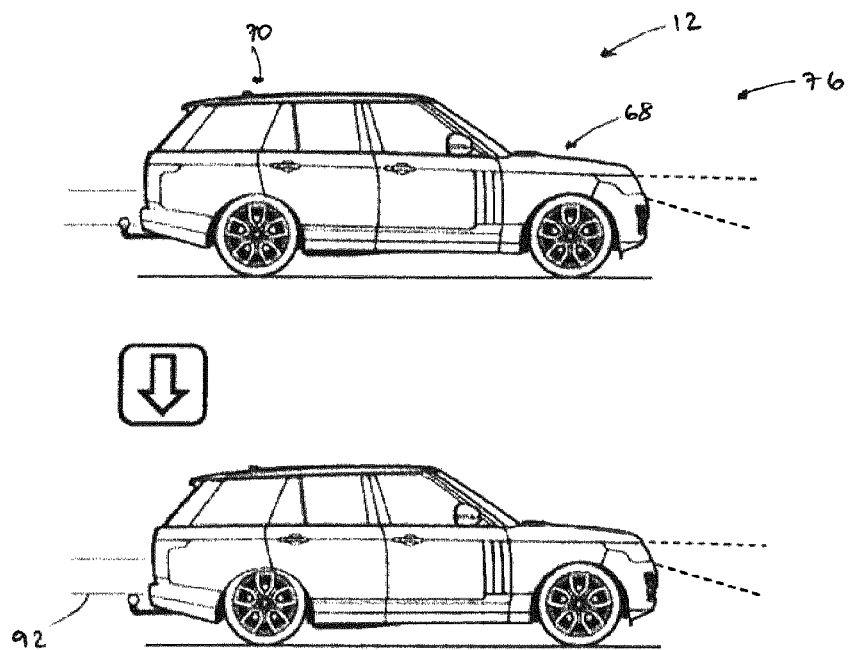
FIG. 6 is a side view of a vehicle comprising the vehicle suspension system of FIG. 1, depicting each of: a starting vehicle height corresponding to the Access vehicle height; and, a target tow hitch height corresponding to the Low tow hitch height.

FIG. 6 depicts the operation of the vehicle suspension system 10 in the event that the user opts to lower the vehicle 12 when the vehicle 12 has been parked at Access height 76, at which the front end 68 and the rear end 70 of the chassis 66 both sit at 50 mm below their respective positions at Normal height 72. Since the front starting height is lower at Access height 76, relative to the front starting height at Normal height 72, the rear end 70 of the chassis 66 must be lowered to a lower rear target height relative to the scenario of FIG. 5 in order to achieve the Low tow ball height 92.

As previously described, the SCM 16 transmits a signal to the corner valves 30, 32 of the rear valve arrangement of the vehicle suspension system 10 and to the pilot exhaust valve 44, to configure the rear valve arrangement to release air from the third and fourth air spring arrangements 54, 56. The third and fourth air spring arrangements 54, 56 contract and the rear end 70 of the chassis 66 is lowered until the rear target height is reached. The rear target height is below the rear target height corresponding to a Normal vehicle starting height, but the required displacement of the rear end 70 of the chassis 66 in achieving the Low tow ball height 92 is smaller. The lowering of the rear end 70 is therefore insufficient to cause unacceptable headlamp beam alignment, and no adjustment is required to the front end 68 of the chassis 66.

Alternatively, the front end 68 and the rear end 70 of the chassis 66 may be lowered in sequence, the rear end 70 being lowered to the rear target height prior to lowering the front end 68 to the front target height, as calculated by the SCM 16.

Figure 7:
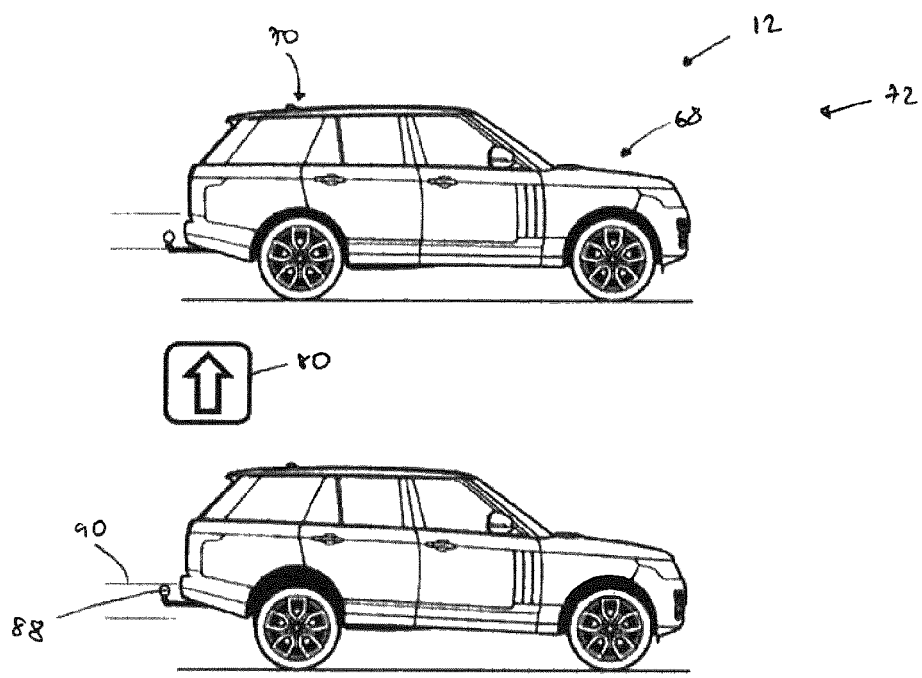
FIG. 7 is a side view of a vehicle comprising the vehicle suspension system of FIG. 1, depicting each of: a starting vehicle height corresponding to the Normal vehicle height; and, a target tow hitch height corresponding to the High tow hitch height.
Figure 8:
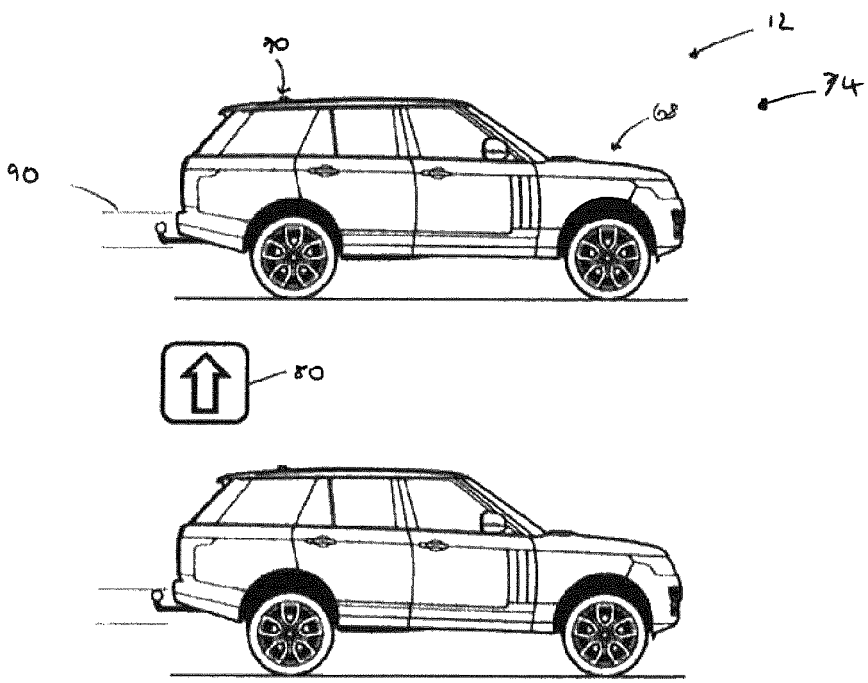
FIG. 8 is a side view of a vehicle comprising the vehicle suspension system of FIG. 1, depicting each of: a starting vehicle height corresponding to the Off-Road vehicle height; and, a target tow hitch height corresponding to the High tow hitch height.

FIGS. 7 and 8 depict the operation of the vehicle suspension system 10 in the event that the user chooses to use the boot-mounted switch 18 to raise the vehicle height from Normal height 72 and Off-Road height 74, respectively. Raising the rear end 70 of the chassis 66 causes the vehicle height to decline towards the front end 68 of the chassis 66, and, as such, the headlamp beam is maintained at an acceptable orientation. Raising the vehicle 12 to achieve the High tow ball height 90 from the Normal height 72 or the Off-Road height 74 therefore requires adjustment of the height of the rear end 70 of the chassis 66 only, and the front end 68 of the chassis 66 remains at the front starting height.

In the scenario of FIG. 7, the user selects the first button 80 of the boot-mounted switch 18, triggering a user-generated control signal to be transmitted to the SCM 16. The SCM 16 simultaneously transmits a signal to the rear right corner valve 30 and rear left corner valve 32 of the vehicle suspension system 10 and to the reservoir valve 48, to configure the vehicle suspension system 10 to allow compressed air to flow from the air reservoir 36 and to the third and fourth spring arrangements 54, 56. The injection of compressed air causes the third and fourth air spring arrangements 54, 56 to expand, and the rear end 70 of the chassis 66 is raised away from the Normal height 72. When the signals from the height sensors 62, 64 indicate that the height target for the rear end 70 of the chassis 66 has been met, the SCM 16 stops transmitting signals to the corner valves 30, 32 of the rear valve arrangement and to the reservoir valve 48, further movement of the rear end 70 of the chassis 66 is prevented and the tow ball 88 is determined to be at the High tow ball height 90.

In the event that the user selects the first button 80 when the vehicle is at the Off-Road height 74, substantially the same process is executed. In the scenario of FIG. 8, however, the front starting height is above that corresponding to a Normal vehicle height 72. Therefore, in order to achieve the High tow ball height 90, the rear target height must be above that set by the SCM 16 when the vehicle 12 is to be lifted from Normal height 72.

After the vehicle height has been adjusted for ease of trailer hitching or unhitching, or for ease of accessing the rear loadspace, the user may wish to reset the tow ball height. In this case, the user can press and hold both the first button 80 and the second button 82 of the boot-mounted switch 18 simultaneously, in order to operate the vehicle suspension system 10 to return to the Normal tow ball height 72. Upon simultaneous selection of both buttons 80, 82 of the boot-mounted switch 18, the SCM 16 sends a signal to the corner valves 30, 32 of the rear valve arrangement and/or the corner valves 26, 28 of the front valve arrangement, as appropriate. Air flow to the air spring arrangements 50, 52, 54, 56 is controlled to raise or lower the chassis to achieve the front target height and rear target height of 0 mm. As previously described, upon lowering the vehicle 12, the SCM 16 transmits a signal to the pilot exhaust valve 44 to allow exhaust of air from the system. Conversely, for raising the vehicle, the SCM 16 transmits a signal to the reservoir valve 48 to permit the flow of compressed air to the relevant air spring arrangements 50, 52, 54, 56.

As mentioned previously, while one or both of the buttons 80, 82 of the boot-mounted switch 18 is pressed and held continuously, the SCM 16 continues to control the air spring arrangements to move towards the target tow ball height. However, the user may wish to hold the tow ball 88 at an intermediate position, between two of the target tow ball heights. This is particularly likely to be the case in the event that the user is attempting to hitch a trailer to the vehicle 12, since the High tow ball height 90 may not be the optimum height for all trailer dimensions and configurations. The user may also wish to adjust the vehicle height incrementally, to allow time for judging the most appropriate tow ball height, or for manipulating the attitude of the trailer during trailer loading and unloading.

In this case, the user may release the selected button(s) 80, 82 of the boot-mounted switch 18 before the target vehicle height is reached. Referring again to FIG. 5, the user may first select the second button 82, configuring the vehicle suspension system 10 to lower the chassis 66. The user can then opt to release the second button 82 at any stage, the rear valve arrangement and front valve arrangement being configured by the SCM 16 to prevent any further flow of air to or from the air spring arrangements 50, 52, 54, 56 of the vehicle.

Upon release of the second button 82, the SCM 16 determines the height of the rear end 70 of the chassis 66, as measured by the rear height sensors 62, 64 of the vehicle suspension system 10. The SCM 16 subsequently calculates the difference between the determined height of the rear end 70 of the chassis 66 and the rear target height, the rear target height corresponding to the Low tow ball height 92. The calculated difference is applied to the front target height, such that the SCM 16 controls the first and second air spring arrangements 50, 52 to adjust the front end 68 of the chassis 66 until the front end 68 is at least as close to the front end target height as the rear end 70 is from the rear end target height. It will be appreciated that the suspension control system 14 may be configured to execute this functionality only in the event of raising the chassis 66. Alternatively, the suspension control system 14 may be configured to execute this functionality in the case of either lowering or raising the chassis 66.

Configuring the SCM 16 to inhibit further movement of the chassis 66 upon release of the second button 82 allows the user to respond to potential entrapment situations, guarding against the possibility of an object becoming trapped beneath the vehicle 12. In one embodiment, after lowering of the front end of the chassis 66, the SCM 16 is further configured to raise the front end 68 of the chassis 66 to the front starting height in response to subsequent selection of the first button 80 of the boot-mounted switch 18.

Figure 9:
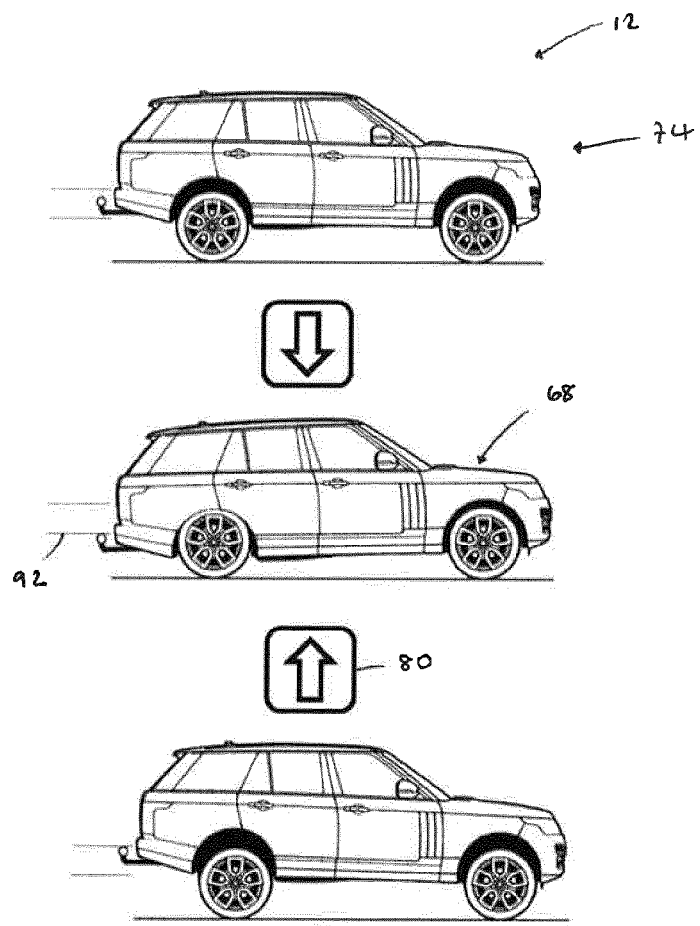
FIG. 9 is a side view of a vehicle comprising the vehicle suspension system of FIG. 1, depicting each of: a starting vehicle height corresponding to the Off-Road vehicle height; a target tow hitch height corresponding to the Low tow hitch height; and, a subsequent target tow hitch height corresponding to the High tow hitch height.

Referring to FIG. 9 as an example, in an initial step the user may have chosen to lower the vehicle 12 from the Off-Road height 74 in order to access the Low tow ball height 92, the front end 68 of the chassis 66 lowering to a first front target height. Upon subsequent selection of the first button 80 of the boot-mounted switch 18, the SCM 16 determines a second front target height to be the front starting height corresponding to the Off-Road height 74. In a next step, the SCM 16 calculates a rear target height that, in combination with the second front target height, will achieve the High tow ball height.

Substantially the same process is executed in the event that the chassis 66 is first lowered from the Normal vehicle height 72 before subsequent selection of the first button 80 of the boot-mounted switch 18. In this case, the front end 68 of the chassis 66 is raised back up to the front starting height corresponding to a Normal vehicle height 72.

The SCM 16 is configured to first instruct raising of the rear end 70 of the chassis 66, prior to raising the front end 68 of the chassis 66. Such motion is quickly apparent to the user positioned at the rear of the vehicle 12, and, as such, gives the user confidence that the vehicle 12 is responding to their request.

Similar functionality may additionally be available in the event that the height of the vehicle 12 has first been raised, if necessary. For example, in the event that the rear end 70 of the chassis 66 is raised significantly, the degree of inclination of the vehicle 12 towards the rear end 70 may reduce the space available beneath the front end 68 of the chassis 66. In this case, upon subsequent selection of the first button 80, the SCM 16 may be configured so as to raise the front end 68 of the chassis 66 to account for the inclination of the vehicle 12, and to relieve any potentially undesirable situations at the front end 68. Such functionality may be automatically available to the user. Alternatively, the user may choose to activate the functionality through interaction with a human machine interface (HMI) within the vehicle cabin.

Therefore, movement of the front end 68 of the chassis 66 can be initiated by three means during operation of the vehicle suspension system 10. Either: upon selection of the second button 82 of the boot-mounted switch 18; upon the rear end 70 of the chassis 66 reaching the rear end target height for a particular tow ball target height; or upon release of a button 80, 82 of the boot-mounted switch 18, prior to the rear height target being reached.

In one embodiment, the user is provided with the option to use a remote input device, such as a key fob associated with the vehicle 12 to operate the vehicle suspension system. As is traditional, the key fob comprises buttons to allow the user to secure the vehicle 12 and to control opening the rear tailgate 78, among other functions. For example, the key fob may have a first button, for operating the hazard warning lights of the vehicle 12, a second button, for opening the rear tailgate 78 of the vehicle 12, a third button for unlocking the vehicle 12, and a fourth button for locking the vehicle 12. The key fob may be automatically configured to operate the vehicle suspension system 10 upon selection of the first button of the key fob. Alternatively, the user may choose to activate the key fob for controlling the vehicle suspension system 10 through input to the HMI of the vehicle 12.

Upon activation of the key fob, the first and second buttons of the key fob may be selectable simultaneously by the user to access the second function of the vehicle 12, lowering the vehicle 12. The first and third buttons of the key fob may be selectable simultaneously to access the first function of the vehicle 12, and to raise the vehicle 12. The first and fourth buttons of the key fob may be selectable simultaneously to reset the vehicle 12 to the Normal tow ball height 72. Such functionality is useful in the event that the boot-mounted switch 18 is inaccessible, for example in the case that a bicycle rack is mounted to the rear of the vehicle 12. In one embodiment, the hazard warning lights of the vehicle 12 must be turned on in order to access the suspension functionality through use of the key fob.

The SCM 16 may be configured to only permit operation of the vehicle suspension system 10 in the event that the air pressure in the reservoir 36 is sufficient to reverse the operation. Such a measure guards against a situation in which the vehicle 12 has been lowered to achieve the Low tow ball height 92, but the air pressure available to the air spring arrangements 50, 52, 54, 56 is insufficient to subsequently lift the vehicle 12. In order to provide the user with a visual indication of the state of the vehicle suspension system 10, one or more of the switches 18, 20 may comprise an indicator. For example, the indicator may be in the form of LEDs provided in proximity to the boot-mounted switch 18, a green LED being illuminated in the case that the suspension system 10 is operable by way of the boot-mounted switch 18, and a red LED being illuminated in the case that the user is not permitted to operate the vehicle suspension system 10.

As hereinbefore described, the height of the chassis 66 at each axle 22, 24 is controlled independently. It will be appreciated that the height of the chassis 66 may optionally be controlled at each wheel, since each corner valve 26, 28, 30, 32 corresponds to a separate air spring arrangement 50, 52, 54, 56 of the vehicle suspension system 10. Upon selection of a button 80, 82 of the boot-mounted switch 18, the SCM 16 determines a front right target height, a front left target height, a rear right target height and a rear left target height, configuring the corner valves 26, 28, 30, 32 to control the flow of air to each of the respective air spring arrangements 50, 52, 54, 56 so as to reach the Low or High tow ball height 92, 90, as required.

The determination of the front right, front left, rear right and rear left target heights may depend in part on a calculated average front target height and a calculated average rear target height. The front right and front left target heights may be calculated so as to achieve the average front target height, and, similarly, the rear right and rear left target heights may be calculated so as to achieve the average rear target height. In the same way as previously described in relation to the front end target height and the rear end target height, the average front and rear target heights can be set so as to achieve the target tow ball height. The use of average target heights can account for situations in which the vehicle 12 is parked on uneven ground.

The front and rear axles 22, 24 of the vehicle may be physical, solid axles connecting the front wheels and the rear wheels of the vehicle, respectively. Alternatively, the terms 'front axle' 22 and 'rear axle' 24 may refer to a front pair of wheels and a rear pair of wheels, each wheel of the pairs of wheels being in an independent suspension arrangement.

As hereinbefore described, selection of the first button 80 of the boot-mounted switch may configure the vehicle suspension system 10 to allow compressed air to flow from the air reservoir 36 and to the third and fourth air spring arrangements 54, 56, such that the rear end 70 of the chassis 66 is raised. Alternatively, it will be appreciated that selection of the first button 80 may configure the vehicle suspension system 10 to allow air to be released from the first and second air spring arrangements 50, 52 while simultaneously allowing compressed air to flow to the third and fourth air spring arrangements 54, 56. In this way, the rear end 70 of the chassis 66 is raised while the front end 68 of the chassis 66 is lowered. Such functionality may allow for the vehicle to reach the High tow ball height 90 more quickly.

It will be understood that the cabin-mounted switch 20 may alternatively or additionally be configured to access the Low tow ball height 92 and/or the High tow ball height 90, the Low tow ball height 92 and/or the High tow ball height 90 being provided as predetermined settings on the dial of the centre console. Similarly, it will be understood that the boot-mounted switch 18 may alternatively or additionally be configured to access the Access vehicle height 76 and/or the Off-Road vehicle height 74.

In practice, the user may wish to use the cabin-mounted switch 20 in combination with the boot-mounted switch 18 to operate the vehicle suspension system 10. For example, the user may choose to access the Low tow ball height 92 through operation of the cabin-mounted switch 20, before using the boot-mounted switch 18 to adjust the height of the tow ball 88 to hitch a trailer to the vehicle 12. The boot-mounted switch 18 allows the user to fine-tune the height of the tow ball 88 from a position at the rear of the vehicle 12. Similarly, the user may wish to un-hitch the trailer using the boot-mounted switch 18, to drive the vehicle 12 forwards to clear the tow ball 88 and to then use the cabin-mounted switch 20 to raise the vehicle height to Normal height 72.

The vehicle suspension system 10 described herein is an 'open' system. It will be appreciated that the invention is equally as applicable to a 'closed' suspension system, in which a compressor pumps air from an air reservoir to air spring arrangements. On lowering of the vehicle, the compressor is reversed to pump air from the air spring arrangements and back into the air reservoir.

Many modifications may be made to the above examples without departing from the scope of the present invention as defined in the accompanying claims.

The invention claimed is:

1. A control system for a suspension height adjustment mechanism of a vehicle, the suspension height adjustment mechanism comprising a front suspension height adjustment mechanism at a front end of the vehicle and a rear suspension height adjustment mechanism at a rear end of the vehicle, the control system being configured to control the suspension height adjustment mechanism in response to user-generated control signals to: increase the height of at least the rear end of the vehicle to a first predetermined vehicle height corresponding to a High tow hitch height; and decrease the height of at least the rear end of the vehicle to a second predetermined vehicle height corresponding to a Low tow hitch height, wherein both the first and second predetermined vehicle heights are accessible from one or more other vehicle height that is different to the first and second predetermined heights; and wherein decreasing the vehicle height from the High tow hitch height to the Low tow hitch height comprises the control system controlling the suspension height adjustment mechanism such that the height of the front end of the vehicle is decreased less than the height of the rear end of the vehicle;

wherein the control system is configured to control the rear suspension height adjustment mechanism and the front suspension height adjustment mechanism such that the height of the rear end of the vehicle is adjusted prior to the height of the front end of the vehicle.

2. The control system of claim 1, wherein the control system is configured to control the suspension height adjustment mechanism to decrease the height of the front end of the vehicle by an amount that is dependent upon headlamp beam alignment.

3. The control system of claim 1, wherein, in response to a user-generated control signal to increase the height of the rear end of the vehicle to the first predetermined height, the control system is configured to determine a rear end target height to which the rear suspension height adjustment mechanism increases the height of the rear end of the vehicle, the rear end target height being determined in dependence on a front starting height.

4. The control system of claim 3, wherein the rear end target height is determined using a look-up table.

5. The control system of claim 1, further comprising one or more input device operable to create a user-generated control signal.

6. The control system of claim 5, wherein said one or more input device comprises a first selector operable to control the suspension height adjustment mechanism to increase the height of at least said rear end of the vehicle, and a second selector operable to control the suspension height adjustment mechanism to decrease the height of at least said rear end of the vehicle.

7. The control system of claim 6, wherein, when the first selector and/or the second selector are operated continuously, the control system is configured to raise or lower at least the rear end of the vehicle in a continuous manner for the duration of the continuous operation.

8. The control system of claim 6, wherein the first selector and/or the second selector are operable by pressing.

9. The control system of claim 7, wherein the suspension height adjustment mechanism is controllable to access a continuum of vehicle heights, a specific height within said continuum being selectable by terminating operation of the first selector and/or the second selector.

10. The control system of claim 5, wherein said one or more input device comprises a manually-operable input device mountable in a boot of the vehicle.

11. The control system of claim 1, further configured to adjust the vehicle height to a third predetermined vehicle height, corresponding to a Normal tow hitch height.

12. The control system of claim 6, further configured to adjust the vehicle height to a third predetermined vehicle height, corresponding to a Normal tow hitch height, wherein the first and second selectors are operable simultaneously so as to adjust the vehicle height to the third predetermined vehicle height.

13. The control system of claim 1, wherein increasing and decreasing the height of the vehicle comprises controlling the suspension height adjustment mechanism so as to pivot a longitudinal axis of the vehicle about a point offset forward from a front axle of the vehicle.

14. The control system of claim 13 wherein pivoting a longitudinal axis of the vehicle about a point offset forward from a front axle of the vehicle comprises controlling the suspension height adjustment mechanism so as to pivot a longitudinal axis of the vehicle about a point offset below and forward from the front axle of the vehicle.

15. The control system of claim 13 wherein pivoting a longitudinal axis of the vehicle about a point offset forward from a front axle of the vehicle comprises controlling the suspension height adjustment mechanism so as to pivot a longitudinal axis of the vehicle about a point offset above and forward from the front axle of the vehicle.

16. A suspension system for a vehicle, comprising the control system as claimed in claim 1.

17. A vehicle comprising the control system as claimed in claim 1.

18. A method of controlling a suspension height adjustment mechanism of a vehicle, the method comprising:
controlling the suspension height adjustment mechanism in response to user-generated control signals to: increase the height of at least a rear end of the vehicle to a first predetermined vehicle height corresponding to a High tow hitch height; and decrease the height of at least said rear end of the vehicle to a second predetermined vehicle height corresponding to a Low tow hitch height, wherein both the first and second predetermined vehicle heights are accessible from one or more other vehicle height that is different to the first and second predetermined heights;
the method further comprising controlling a front suspension height adjustment mechanism at a front end of the vehicle and controlling a rear suspension height adjustment mechanism at the rear end of the vehicle, wherein decreasing the vehicle height from the High tow hitch height to the Low tow hitch height comprises controlling the suspension height adjustment mechanism such that the height of the front end of the vehicle is decreased less than the height of the rear end of the vehicle;
and wherein the method further comprises controlling the rear suspension height adjustment mechanism and the front suspension height adjustment mechanism such that the height of the rear end of the vehicle is adjusted prior to the height of the front end of the vehicle.

19. A controller for controlling a suspension height adjustment mechanism of a vehicle, the controller comprising:
an electronic processor having an electrical input for receiving: a first user-generated signal indicative of a user selection of a first predetermined vehicle height corresponding to a High tow hitch height; and a second user-generated signal indicative of a user selection of a second predetermined vehicle height corresponding to a Low tow hitch height;
an electronic memory device electrically coupled to the electronic processor and having instructions stored therein,
the processor being configured to access the memory device and execute the instructions stored therein such that it is operable to:
control the suspension height adjustment mechanism in response to said first user-generated control signal to increase the height of at least a rear end the vehicle to the first predetermined vehicle height, and control the suspension height adjustment mechanism in response to said second user-generated control signal to decrease the height of at least said rear end of the vehicle to said second predetermined vehicle height, wherein both the first and second predetermined vehicle heights are accessible from one or more other vehicle height that is different to the first and second predetermined heights, and wherein, in response to the second user-generated signal, the processor controls a front suspension height adjustment mechanism (at a front end of the vehicle and controls a rear suspension height adjustment mechanism at the rear end of the vehicle such that the height of the front end of the vehicle is decreased less than the height of the rear end of the vehicle; and
to control the rear suspension height adjustment mechanism and the front suspension height adjustment mechanism such that the height of the rear end of the vehicle is adjusted prior to the height of the front end of the vehicle.

20. A non-transitory, computer-readable storage medium storing instructions thereon that when executed by one or more electronic processors causes the one or more electronic processors to carry out the method of claim 18.

* * * * *